(12) United States Patent
Jennings et al.

(10) Patent No.: US 7,673,846 B2
(45) Date of Patent: Mar. 9, 2010

(54) TUBE CONFIGURED PRESSURE REGULATING VALVE

(76) Inventors: Jeffrey D. Jennings, 29 Thistlewood La., Hendersonville, NC (US) 28791; Franz W. Kellar, 3757 Kennedy Rd., Gastonia, NC (US) 28056; Donald G. Faulkner, 6127 Lexham La., Charlotte, NC (US) 28277

( * ) Notice: Subject to any disclaimer, the term of this patent is extended or adjusted under 35 U.S.C. 154(b) by 274 days.

(21) Appl. No.: 11/611,920

(22) Filed: Dec. 18, 2006

(65) Prior Publication Data

US 2008/0142747 A1 Jun. 19, 2008

(51) Int. Cl.
*F16K 7/04* (2006.01)
(52) U.S. Cl. .......................... 251/5; 251/4; 137/599.01
(58) Field of Classification Search ................. 251/4, 251/5; 137/599.01, 601.13
See application file for complete search history.

(56) References Cited

U.S. PATENT DOCUMENTS

| | | | | |
|---|---|---|---|---|
| 2,998,103 A | * | 8/1961 | Klaue | .................. 188/71.4 |
| 4,717,047 A | * | 1/1988 | van Overbruggen et al. | 222/207 |
| 5,735,817 A | * | 4/1998 | Shantha | .................. 604/100.02 |
| 6,164,564 A | * | 12/2000 | Franco et al. | ............ 239/284.1 |
| 6,773,670 B2 | * | 8/2004 | Stringer et al. | ................. 422/44 |

* cited by examiner

*Primary Examiner*—John K Fristoe, Jr.
(74) *Attorney, Agent, or Firm*—Trego, Hines & Ladenheim, PLLC

(57) ABSTRACT

A pressure regulating valve includes a body having an outer surface, the interior of the body defining an inlet chamber adapted to receive a fluid at a process pressure, and an outlet chamber. The body includes at least one inlet passage communicating with the inlet chamber and the outer surface, and at least one outlet passage communicating with the outer surface and the outlet chamber. A reference housing is adapted to be disposed in fluid communication with a fluid at a predetermined reference pressure. An annular membrane is disposed between the body and the reference housing, so as to circumscribe the inlet and outlet passages. The membrane is arranged such that, when the reference pressure is higher than the process pressure the membrane engages at least one outlet passage, and when the process pressure is higher than the reference pressure, the membrane is not engaged with the outlet passage.

9 Claims, 17 Drawing Sheets

TUBE CONFIGURED PRESSURE REGULATING VALVE

FIELD OF THE INVENTION

The present invention relates to fluid systems and more particularly to a pressure regulating valve which balances a process pressure against a reference pressure signal.

BACKGROUND

There is a need for a precise pressure regulating device which can control fluid pressures at very low levels, for example in the range of body cavity or arterial or venous pressures. Further, it would be useful if such a regulator could be controlled automatically through a remote pressure signal. Further, there is a need for such a regulator to be hygienic and made from medically compatible and approved materials. All components of such a device which come into contact with bodily fluids should further be either disposable or autoclavable. There is also need for a small disposable precision regulator that can be used to control critical fluid flows such as medicine, bile, plasma, saline solution and blood, internally and externally; locally and over a broad region of a patient's body.

SUMMARY OF THE INVENTION

Accordingly, it is an object of the invention to provide a pressure regulating valve having a simple tube-like physical configuration.

It is another object of the invention to provide a pressure regulating valve which can be used to meter precision flow.

These and other objects are met by the present invention, which in one aspect provides a pressure regulating valve including: a body having an outer surface, the interior of the body separated into an inlet chamber adapted to be disposed in fluid communication with a fluid at a process pressure, and an outlet chamber, the body further including at least one inlet passage disposed in fluid communication with the inlet chamber and the outer surface, and at least one outlet passage communicating with the outer surface and the outlet chamber; a reference housing adapted to be disposed in fluid communication with a fluid at a predetermined reference pressure; and an annular membrane disposed between the body and the reference housing, so as to circumscribe both the inlet and outlet passages; wherein the membrane is arranged such that, when the reference pressure is higher than the process pressure the membrane is engaged with the at least one outlet passage, and when the process pressure is higher than the reference pressure, the membrane is not engaged with the outlet passage.

According to another aspect of the invention, at least one of the body, the membrane, and the reference housing is as least partially transparent.

According to another aspect of the invention, the membrane is a thermoplastic film having a thickness of about 0.0005 inches to about 0.005 inches.

According to another aspect of the invention, the body is a generally cylindrical tube having a bulkhead disposed therein to separate the interior of the body into the inlet chamber and the outlet chamber.

According to another aspect of the invention, the body is removably retained within the reference housing.

According to another aspect of the invention, the pressure regulating valve further includes a bypass outlet connected in fluid communication with the inlet chamber.

According to another aspect of the invention, the body is a generally cylindrical tube having a bulkhead disposed therein to separate the interior of the body into the inlet chamber and the outlet chamber; and at least one compressible member is disposed in the inlet chamber or the outlet chamber.

According to another aspect of the invention, the body is a generally cylindrical tube having a bulkhead disposed therein to separate the interior of the body into the inlet chamber and the outlet chamber, wherein the bulkhead includes a pair of spaced-apart, flexible walls defining a void therebetween.

According to another aspect of the invention, at least one fluid-wetted surface of the pressure regulating valve is coated with a surface treatment effective to prevent the clotting of blood platelets thereon.

According to another aspect of the invention, the pressure regulating valve further includes means for biasing the membrane away from the body in a rest position.

According to another aspect of the invention, a fluid system includes: a process vessel adapted to contain fluid at a predetermined process pressure; a reference pressure source adapted to supply fluid at a predetermined reference pressure; and a pressure regulating valve including: a body having an outer surface, the interior of the body separated into an inlet chamber connected in fluid communication with the process vessel, and an outlet chamber, the body further including at least one inlet passage disposed in fluid communication with the inlet chamber and the outer surface, and at least one outlet passage communicating with the outer surface and the outlet chamber; a reference housing connected in fluid communication with the reference pressure source; and an annular membrane disposed between the body and the reference housing, so as to circumscribe both the inlet and outlet passages; wherein the membrane is arranged such that, when the reference pressure is higher than the process pressure the membrane is engaged with the at least one outlet passage, and when the process pressure is higher than the reference pressure, the membrane is not engaged with the outlet passage, so as to allow fluid to be vented from the process vessel through the outlet chamber, thereby reducing the pressure within.

According to another aspect of the invention, a fluid system includes: a process pressure source adapted to provide fluid at a periodically varying process pressure; a reference pressure source adapted to supply fluid at a predetermined reference pressure; and a pressure regulating valve including: a body having an outer surface, the interior of the body separated into an inlet chamber connected in fluid communication with the process vessel, and an outlet chamber, the body further including at least one inlet passage disposed in fluid communication with the inlet chamber and the outer surface, and at least one outlet passage communicating with the outer surface and the outlet chamber; a reference housing connected in fluid communication with the reference pressure source; and an annular membrane disposed between the body and the reference housing, so as to circumscribe both the inlet and outlet passages. The membrane is arranged such that, when the reference pressure is higher than the process pressure the membrane is engaged with the at least one outlet passage, and when the process pressure is higher than the reference pressure, the membrane is not engaged with the outlet passage, so as to allow fluid to be discharged from the outlet chamber.

According to another aspect of the invention, the process pressure source is a peristaltic pump.

According to another aspect of the invention, a fluid system comprising: a process pressure source adapted to supply fluid at a predetermined process pressure; a reference pressure source adapted to supply fluid at a periodically varying reference pressure; and a pressure regulating valve including: a body having an outer surface, the interior of the body separated into an inlet chamber connected in fluid communication with the process vessel, and an outlet chamber, the body further including at least one inlet passage disposed in fluid communication with the inlet chamber and the outer surface, and at least one outlet passage communicating with the outer surface and the outlet chamber; a reference housing connected in fluid communication with the reference pressure source; and an annular membrane disposed between the body and the reference housing, so as to circumscribe both the inlet and outlet passages. The membrane is arranged such that, when the reference pressure is higher than the process pressure the membrane is engaged with the at least one outlet passage, and when the reference pressure is lower than the reference pressure, the membrane is not engaged with the outlet passage, so as to allow fluid to be discharged from the outlet chamber.

According to another aspect of the invention, a fluid system includes: a process pressure source adapted to supply fluid at a predetermined process pressure; a reference pressure source adapted to supply fluid at a predetermined reference pressure; and a pressure regulating valve comprising: a body having an outer surface, the interior of the body separated into an inlet chamber connected in fluid communication with the process vessel, and an outlet chamber, the body further including at least one inlet passage disposed in fluid communication with the inlet chamber and the outer surface, and at least one outlet passage communicating with the outer surface and the outlet chamber; a reference housing connected in fluid communication with the reference pressure source; an annular membrane disposed between the body and the reference housing, so as to circumscribe both the inlet and outlet passages wherein the membrane is arranged such that, when the reference pressure is higher than the process pressure the membrane is engaged with the at least one outlet passage, and when the reference pressure is lower than the reference pressure, the membrane is not engaged with the outlet passage; a bypass outlet connected in fluid communication with the inlet chamber to direct fluid to a downstream flow system; and an outlet device having a predetermined fluid conductance connected in fluid communication with the bypass outlet.

According to another aspect of the invention, the outlet device is a calibrated orifice.

According to another aspect of the invention, the outlet device is a capillary tube.

BRIEF DESCRIPTION OF DRAWINGS

The invention may be best understood by reference to the following description taken in conjunction with the accompanying drawing figures in which.

DETAILED DESCRIPTION

Figure 1:
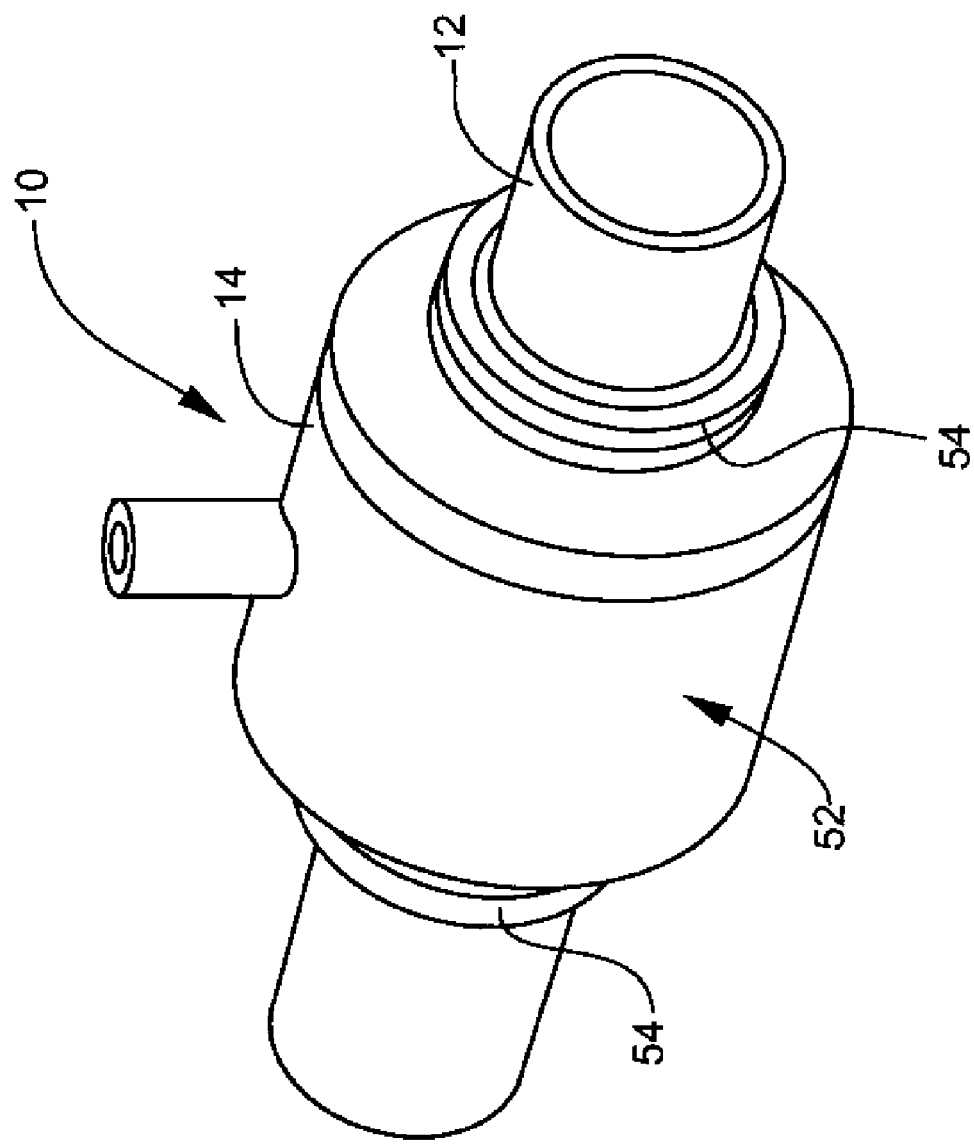
FIG. 1 is perspective view of an exemplary pressure regulating valve constructed according to one aspect of the present invention.
Figure 2:
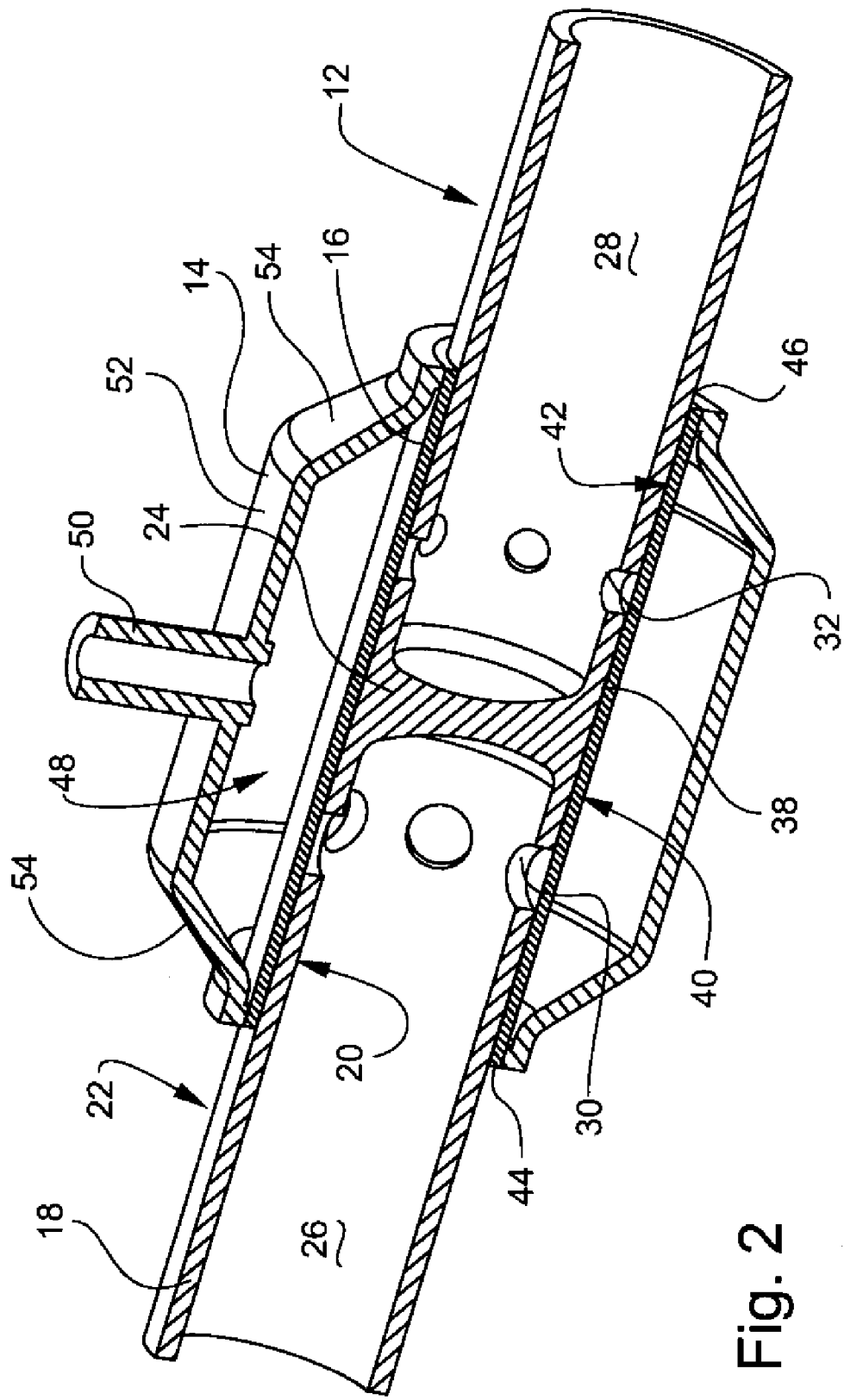
FIG. 2 is a cross-sectional view of the pressure regulating valve of FIG. 1.

Referring to the drawings wherein identical reference numerals denote the same elements throughout the various views, FIGS. 1 and 2 illustrate an exemplary pressure regulating valve 10 constructed according to the present invention. The term "pressure regulating valve" is used here generically to refer to a device which is responsive to differential pressures applied thereto and which is capable of functioning as either a back pressure regulator or as a relief valve, depending on how it is arranged within a fluid system.

For purposes of explanation, it is noted that "back pressure regulator" and "relief valve" are two similar terms which describe the same functional device, though with different operational emphases. For relief valves, the emphasis is on the off/on flow interface, with expectations of zero flow through the device up to some predetermined set pressure, and maximum flow above the set pressure. For back pressure regulators, the emphasis is often on steady state flow control at a desired pressure set-point over a defined flow rate window, with less emphasis on the off/on flow threshold.

The basic components of the pressure regulating valve 10 are a body 12, a reference housing 14, and a membrane 16. The body 12 is an elongated, generally cylindrical member with a wall 18 defining inner and outer surfaces 20 and 22. Other cross-sectional shapes (i.e. non-circular) may be used as well. A bulkhead 24 or other non-permeable blocking structure separates the interior of the body 12 into an inlet chamber 26 and an outlet chamber 28.

The body 12 may be built up from separate parts or it may be molded, cast, or machined from a single piece of material. Examples of suitable materials include metal alloys and polymers. In medical applications, it is desirable to use materials which are hygienic and bio-compatible, such as stainless steel or polytetrafluoroethylene (PTFE). In a preferred construction, the body 12 is molded as a single integral unit.

Any or all of the fluid-wetted surfaces of the body 12, reference housing 14, and/or membrane 16 may be provided with a coating of a carbon-based coating material deposited thereon. This material has an amorphous microstructure and exhibits a flexural capability of approximately 35% or better. This enables the coating to endure significant vibration without cracking or detaching from the substrate. Such coatings may be obtained from HiDuraFlex LLC, Huntersville, N.C., 28078. The coating may have a thickness "t" from about 2 μm (0.08 mil) to about 6 μm (0.24 mil), and more specifically from about 2 μm (0.08 mil) to about 3 μm (0.12 mil). This coating is effective to prevent clotting of blood platelets on the coated surfaces.

A plurality of inlet passages 30 are formed through the wall 18 on a first side of the bulkhead 24, in communication with the inlet chamber 26. A plurality of outlet passages 32 are formed through the wall 18 on the opposite side of the bulkhead 24 in communication with the outlet chamber 28. The size, shape, number, and spacing of the inlet and outlet passages 30 and 32 may be varied to suit a particular application.

Appropriate means are provided for connecting the inlet and/or outlet chambers to cooperating equipment. Material transiting through the outlet chamber 28 may be captured, collected or re-routed to a desired location through downstream tubing (not shown), or the outlet chamber 28 could be open to the external environment.

A flexible, tube-like membrane 16 is disposed around the outer surface 22 of the body 12 and covers the inlet and outlet passages 30 and 32. The membrane 16 may be described as having a "looped" structure, i.e. it has a central portion 38 defining opposed reference and process surfaces 40 and 42, bounded by spaced-apart edges 44 and 46. In a preferred embodiment, annular portions of the membrane 16 are constrained from movement away from the outer surface 22 of the body. For example, the membrane 16 may be joined to the outer surface 22 by means such as thermal or sonic welding, adhesives, fasteners, or a constraining clamp.

Non-limiting examples of suitable materials for the membrane 16 include thin films of polyethylene, polypropylene or blends thereof, and fluoropolymers such as PTFE, PFA, PVDF, and FEP. Such films may be joined into a loop by thermal welding or other similar means, or may be extruded as a thin film loop. Film thicknesses in the range of about 0.013 mm (0.5 mils) to about 0.13 mm (5 mils) would be suitable for the membrane 16. For very low pressures in the range of human blood pressure, for example, a thermoplastic film with a thickness of about 0.013 mm (0.5 mils) to about 0.06 mm (2.5 mils) would be preferable. The membrane 16 may be constructed from a material which is chemically inert and/or chemically resistant. One example of such a material is polytetrafluoroethylene (PTFE). When combined with a chemically inert and/or chemically resistant body material as described above, the pressure regulating valve 10 is made fully compatible for aggressive chemical contact.

The reference housing 14 surrounds the body 12 and the membrane 16 to form a closed reference volume 48 which encloses at least the inlet and outlet passages 30 and 32. A reference port 50 communicates with the reference volume 48. In the illustrated example, the reference housing 14 includes an enlarged cylindrical center section 52 with reduced-diameter collars 54 at each end. The collars 54 may be sized to tightly retain the membrane 16 and the reference housing 14 to the body 12. The reference housing 14 may also be attached or joined to the membrane 16 and/or the outer surface 22 by means such as thermal or sonic welding, adhesives, fasteners, or a constraining clamp. The reference housing 14 may also be sized so that the body 12 with the attached membrane 16 can be removed therefrom, and suitable resilient seals (not shown) provided between the reference housing 14 and the body 12. This allows the reference housing 14 to be reused with a disposable body 12 and membrane 16, which may be important in some medical applications.

The reference housing 14, body 12, and/or membrane 16, or at least portions thereof, may be made at least partially transparent. This allows the ability to visually monitor the function of the pressure regulating valve 10. This is an especially useful feature in medical and industrial applications.

As will be more fully understood from further descriptions when the pressure exerted on the reference surface 40 of the membrane 16 exceeds the pressure on the process surface 42 of the membrane 16 at the inlet passages 30, the inlet passages 30 and outlet passages 32 are engaged by the membrane 16 thereby sealing the inlet passages 30 and prohibiting material, or the pressure created by material, from passing through the inlet and outlet passages 30 and 32. When the pressure in the inlet passage 30 is sufficient to dislodge the membrane 16 from sealing engagement with the inlet passage 30, the membrane 16 is persuaded towards the reference housing 14 thereby disengaging the membrane 16 from at least one inlet passage 30 and at least one outlet passage 32 thereby forming a flow channel from the inlet passage 30 to the outlet passage 32 whereby the pressure is released through the outlet passage 32.

Figure 12:
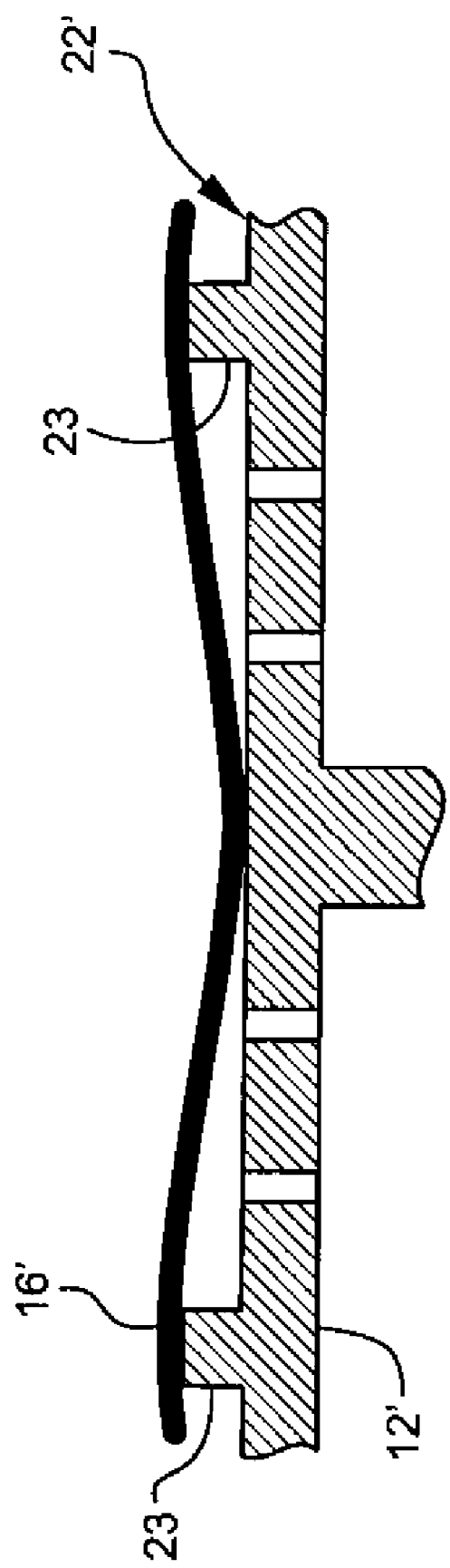
FIG. 12 is a cross-sectional view of a portion of an alternate pressure regulating valve body and membrane.
Figure 13:
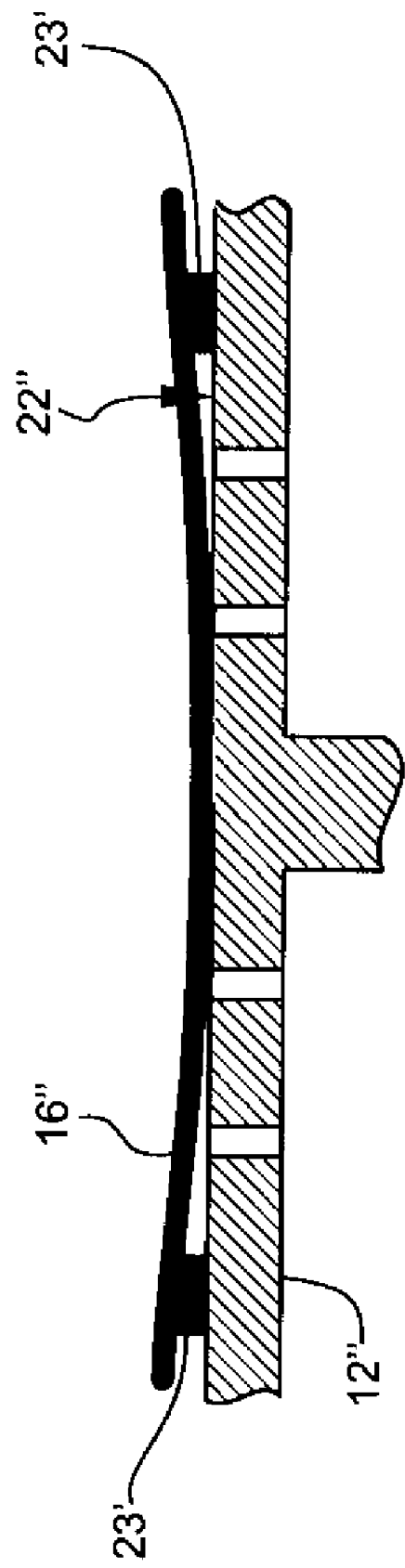
FIG. 13 is a cross-sectional view of a portion of another alternate pressure regulating valve body and membrane.
Figure 14:
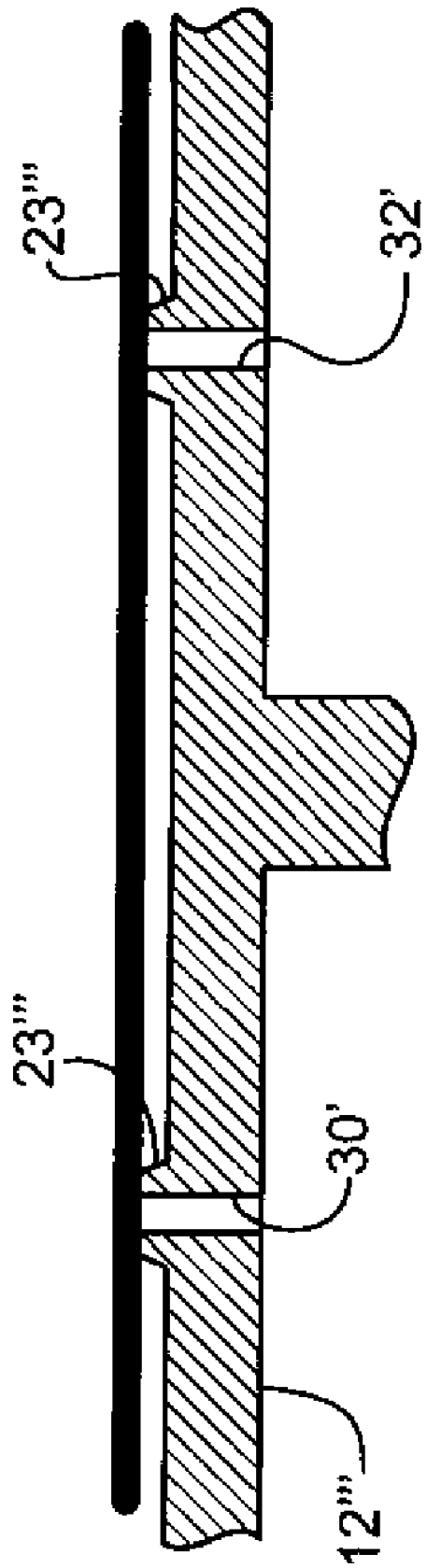
FIG. 14 is a cross-sectional view of a portion of yet another an alternate pressure regulating valve body and membrane.

In some instances, it may be desirable to configure the body 12 and/or membrane 16 to effectively bias the membrane 16 away from the body 12 in a rest position (i.e. towards an "open" or "flow" position). For example, FIG. 12 illustrates a portion of a body 12' with raised, outwardly-extending rings 23 protruding from an outer surface 22'. The rings 23 cause end portions of the membrane 16' to stand away from the surface 22'. FIG. 13 illustrates a portion of an alternate body 12" and a membrane 16" which includes raised, inwardly-extending rings 23'. The rings 23' cause the membrane 16" to stand away from the outer surface 22" of the body 12". FIG. 14 illustrates a body 12'" having raised rims 23'" disposed around each of the inlet passages 30' and outlet passages 32'. These rims 23'" have a similar effect.

Figure 3:
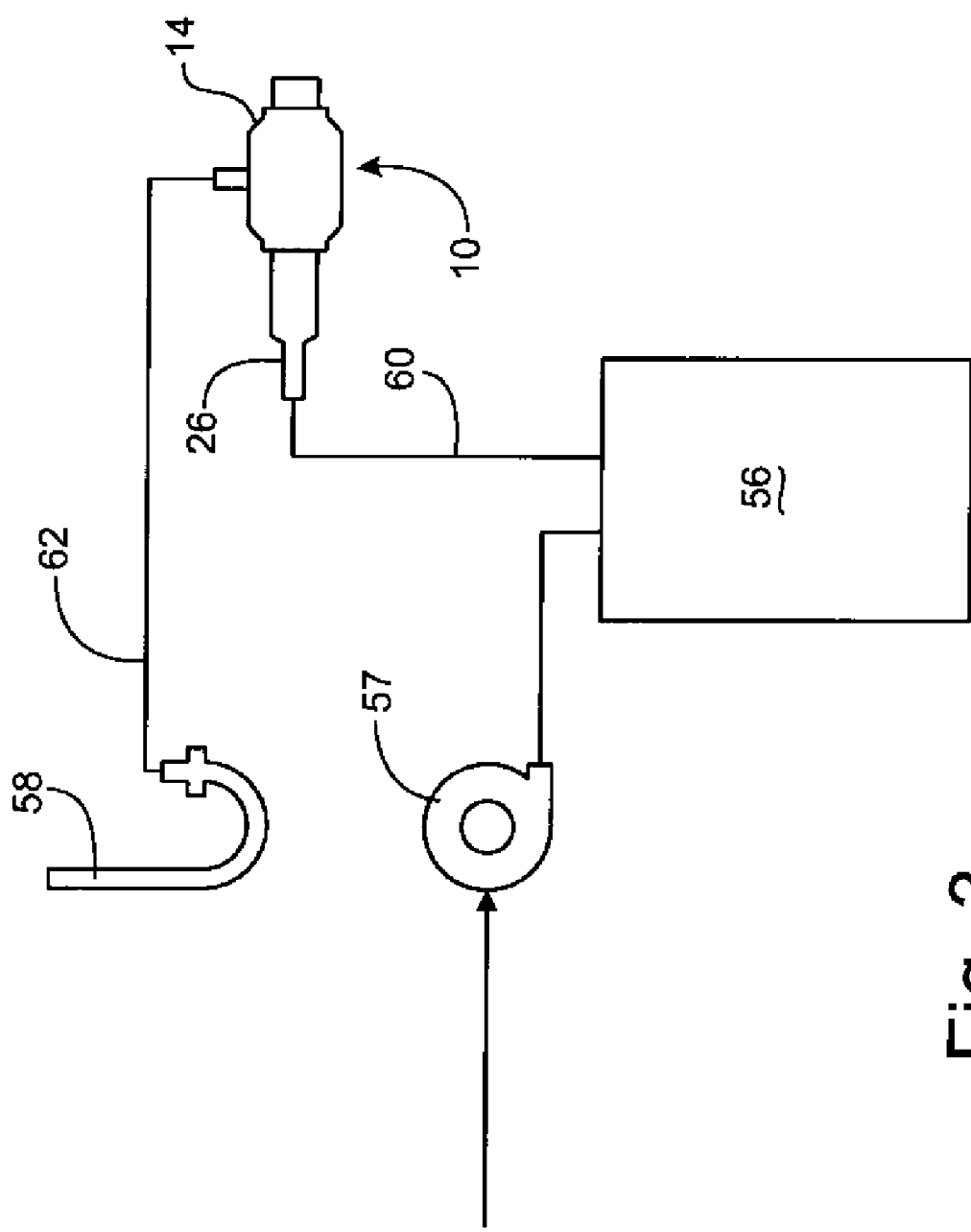
FIG. 3 is a schematic representation of a fluid system incorporating the pressure regulating valve of FIG. 2.

A schematic representation of a process system incorporating the pressure regulating valve 10' used as a back-pressure regulator, is illustrated in FIG. 3. The process system includes a process vessel 56 containing a fluid (gas, liquid, or a combination thereof) and a pressure reference source 58, such as the illustrated manometer. A process fluid inflow is provided into the process vessel 56, for example from pump 57 The process vessel 56 is connected to the inlet chamber 26 of the pressure regulating valve 10 by a line 60. The reference housing 14 is connected to the reference pressure source 58 by a line 62.

The pressure in the process vessel 56 is maintained by venting through the pressure regulating valve 10. The system allows for accurate, rapid pressure control in the process vessel 56. For example, if the operator desires to increase the pressure in the process vessel 56, the pressure from the reference pressure source 58 is increased. The pressure above the membrane 16 would then be increased allowing pressure buildup in the process vessel 56 due to the inflow from pump 57. Once the pressure in the process vessel 56 equals the pressure supplied by the reference pressure source 58, the pressure regulating valve 10 closes. If the operator desires to lower the pressure in the process vessel 56, the pressure supplied by the reference pressure source 58 is decreased. The pressure exerted on the membrane 16 will then be lower on the reference surface 40 of the membrane 16 and the process pressure will be allowed to vent through the outlet chamber 28 until the pressure on each side of the membrane 16 is rebalanced.

Figure 4:
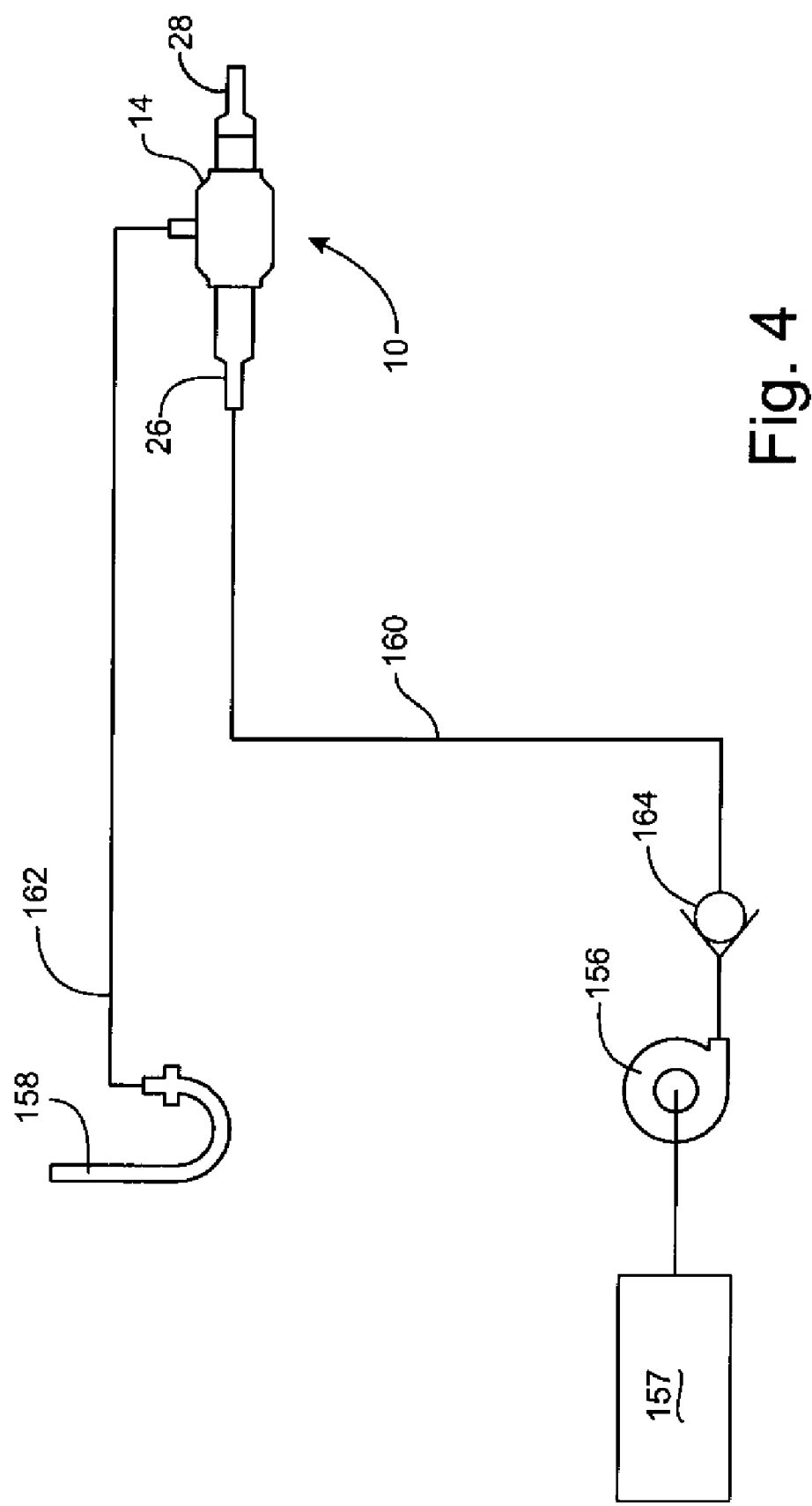
FIG. 4 is a schematic representation of another fluid system incorporating the pressure regulating valve of FIG. 2.

FIG. 4 illustrates a process system incorporating the pressure regulating valve 10 to achieve metered fluid flow. The process system includes a pressure reference source 158 connected to the reference housing 14 by a reference line 162. The inlet chamber 26 of the pressure regulating valve 10 is connected to a process pressure source 156 through a line

Figure 5:
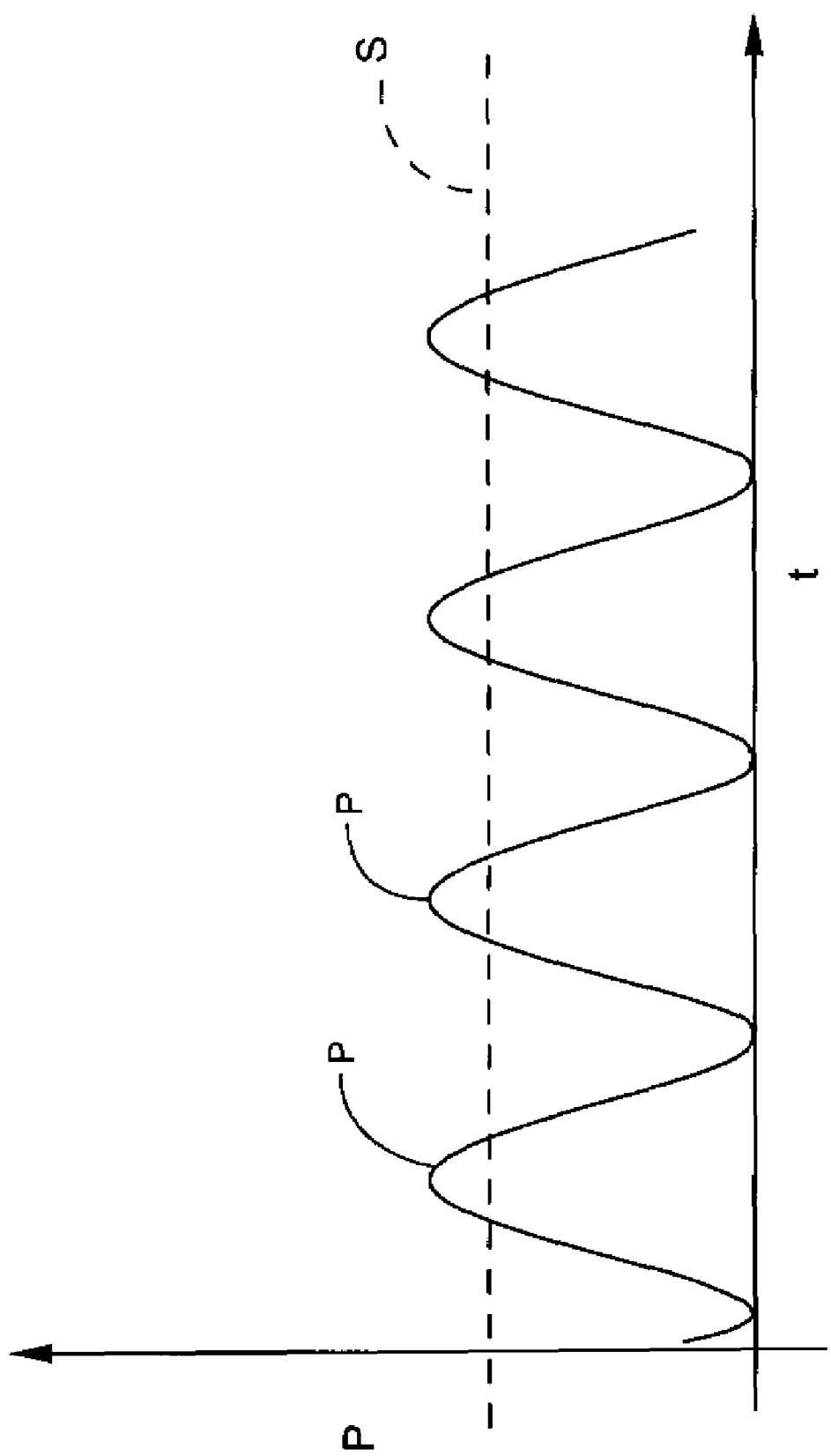
FIG. 5 is a graph illustrating the flow characteristics of a pulsatile pressure source.
Figure 6:
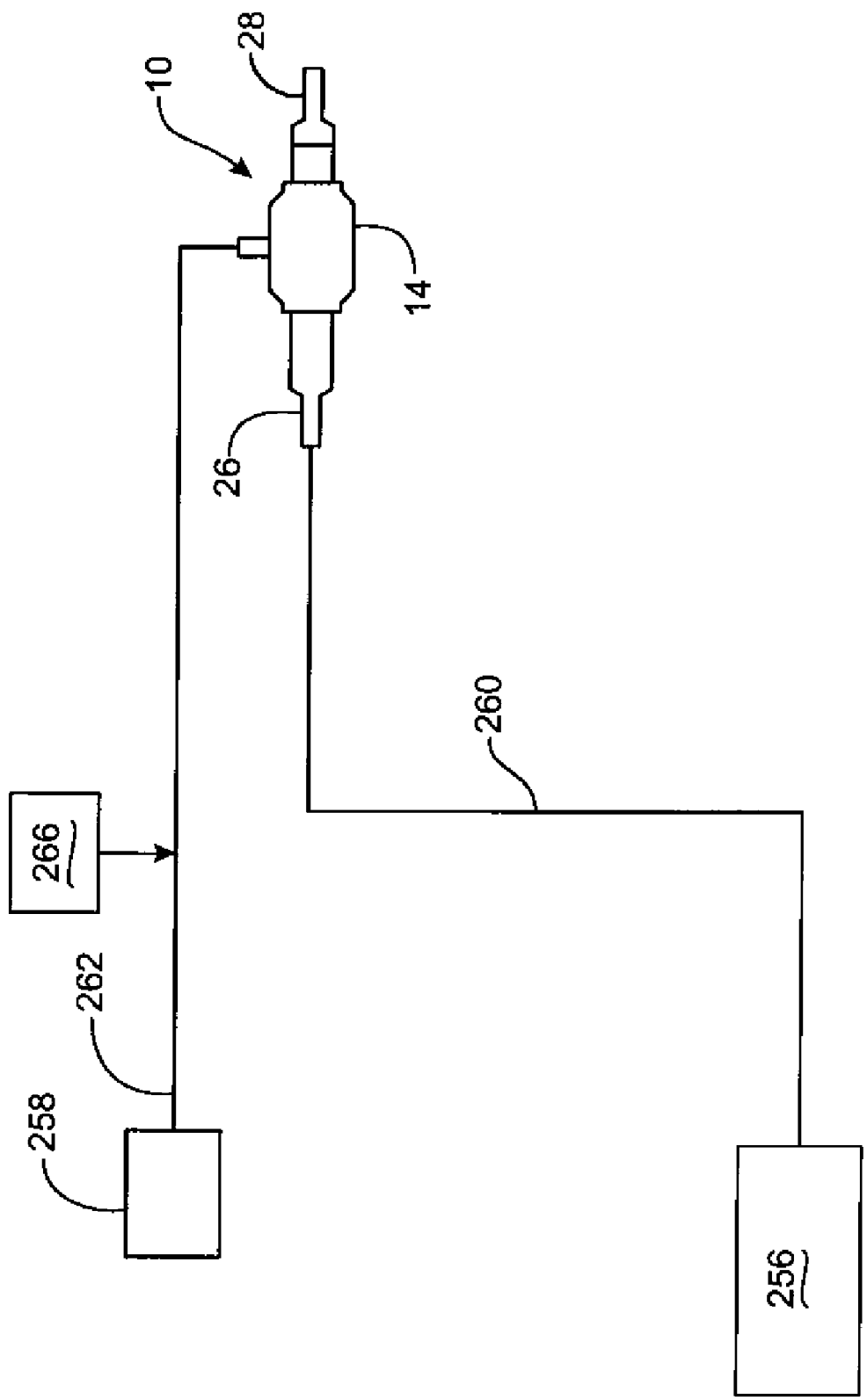
FIG. 6 is a schematic representation of another fluid system incorporating the pressure regulating valve of FIG. 2.
Figure 7:
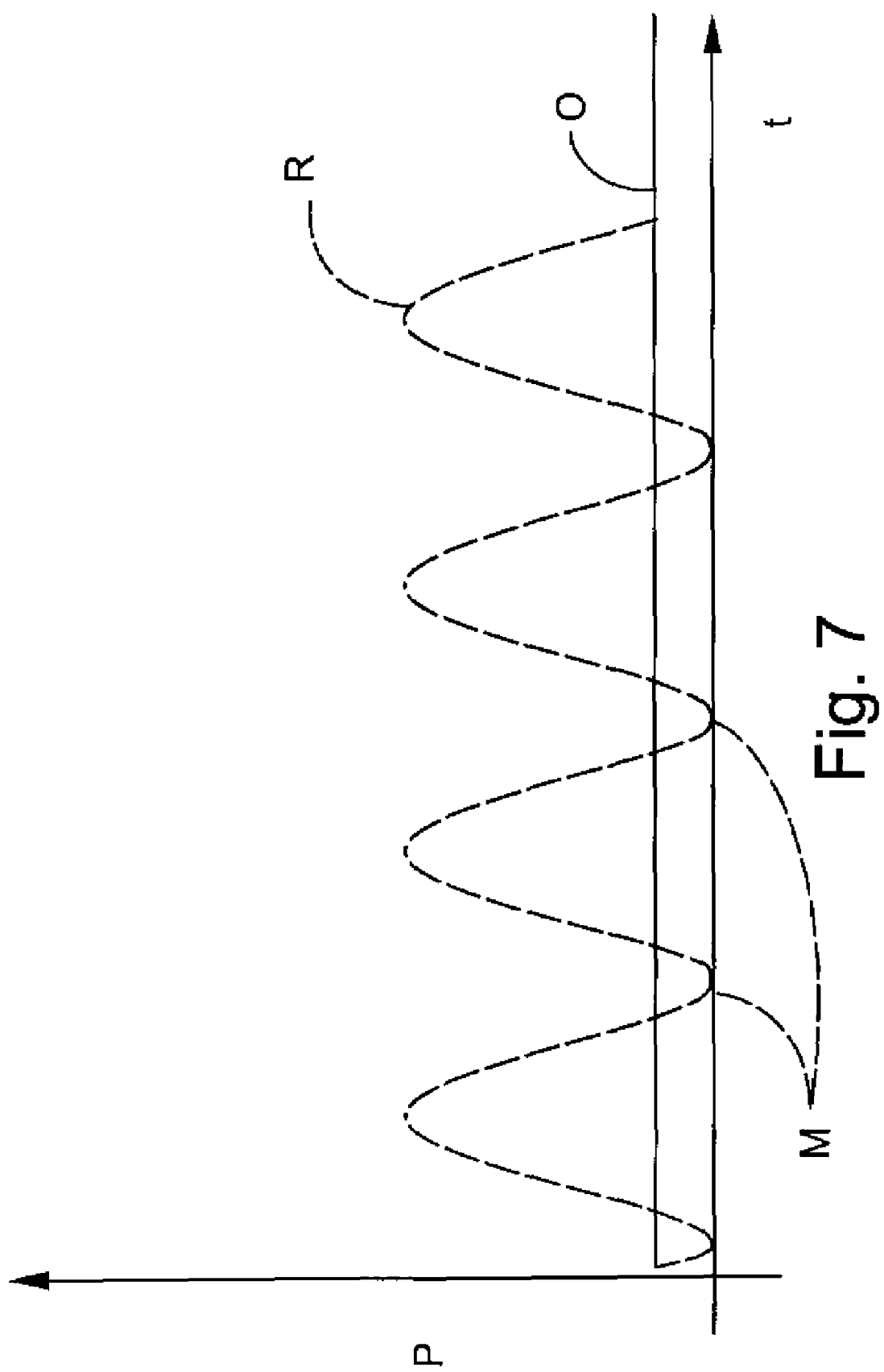
FIG. 7 is a graph illustrating the flow characteristics of a pulsatile reference pressure source.

160. A check valve 164 may be used to allow flow towards the pressure regulating valve 10 but not in the opposite direction. In this example, the process pressure source 156 is a pump having a pulsatile output, such as a peristaltic pump of a known type, drawing from a reservoir 157. As seen in FIG. 5, the pressure-time output characteristic of such a pump is such that pressure peaks "p" occur at a regular interval. To accomplish metered output, the pressure set point "S" of the pressure regulating valve 10 is selected such that as the pressure pulse from the process pressure source 156 exceeds the set point S, the membrane 16 will crack open and permit fluid flow through the outlet chamber 28 and to a downstream process. As the pressure from the process pressure source 156 decreases, the membrane 16 closes and shuts off downstream flow until the pressure again increases above the pressure set point. The fluid volume dispensed during the open cycle is very specific, and any overpressurization to the downstream system is limited. This feature could be especially useful in protecting sensitive biomaterials from compression damage due to over pressurization of the process system FIG. 6 illustrates another process system incorporating the pressure regulating valve 10 to achieve metered fluid flow. The process system includes a pressure reference source 258 connected to the reference housing 14 by a reference line 262. The inlet chamber 26 of the pressure regulating valve 10 is connected to a process pressure source 256 through a line 260. A pulse generator 266 (for example an electro-pneumatic transducer) is connected to the system, for example by being connected to the line 262. The pulse generator 266 is effective to impress a time-varying aspect one the reference pressure delivered to the reference housing 14. For example, as seen in FIG. 7, the modified reference pressure "R" has a generally sinusoidal characteristic with minimums "M" occurring at a regular interval. To accomplish metered output, the reference pressure R minimums and the operating pressure "O" are chosen such that as the pressure pulse from the pulse generator 266 drops below the operating pressure O, the membrane 16 will crack open and permit fluid flow through the outlet chamber 28 and to a downstream process. As the reference pressure R increases, the membrane 16 closes and cuts off flow.

Figure 15:
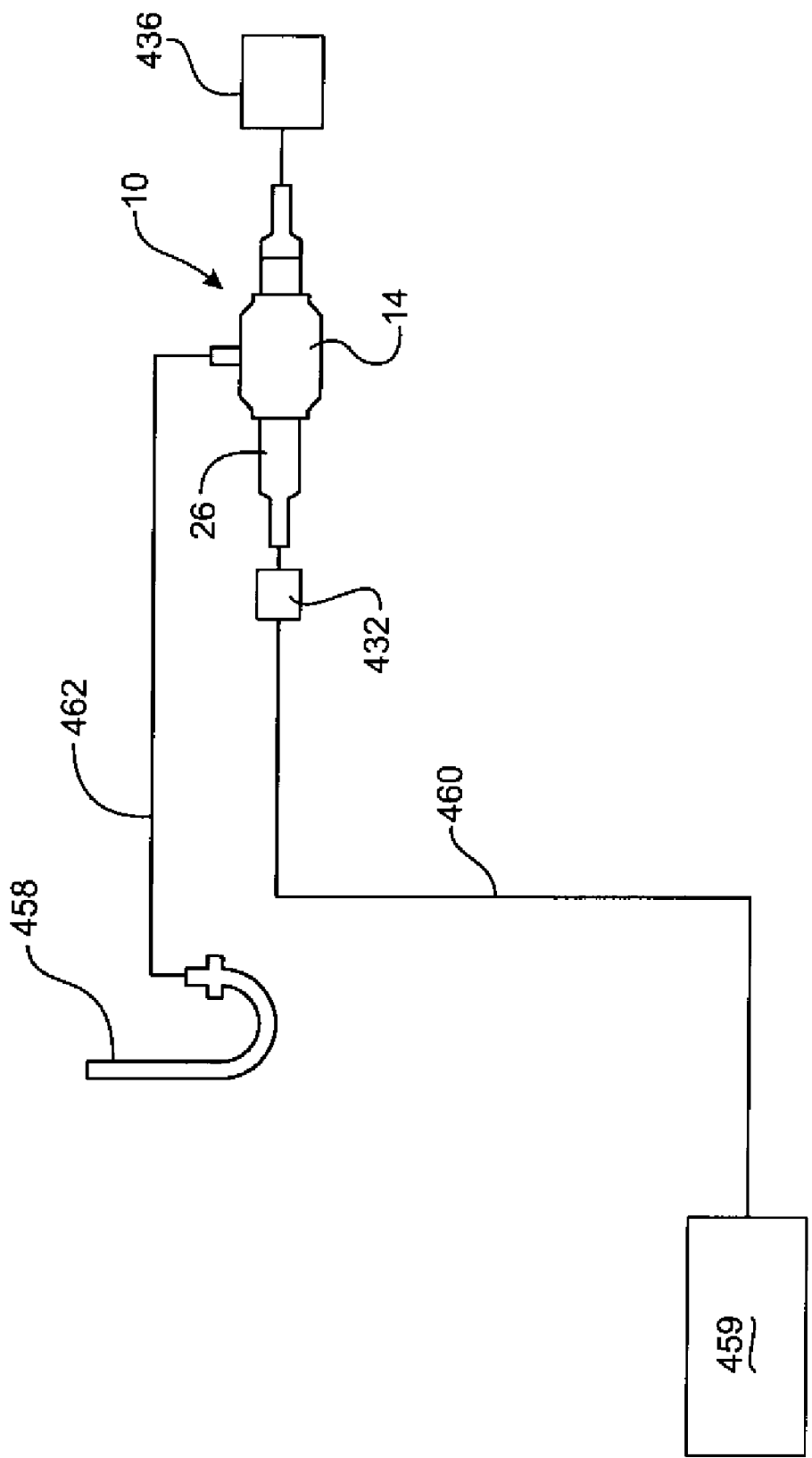
FIG. 15 is a schematic representation of another fluid system incorporating the pressure regulating valve of FIG. 2

FIG. 15 illustrates another process system incorporating the pressure regulating valve 10 to achieve metered fluid flow. The process system includes a pressure reference source 458 connected to the reference housing 14 by a line 462. The inlet chamber 26 of the pressure regulating valve 10 is connected to a process pressure source 459 through a line 460. A restriction, shown schematically at 432, of known fluid conductance (such as a precision orifice or capillary tube) is connected in series with the inlet chamber 26. This configuration results in a stable, predictable flow rate through the pressure regulating valve 10 to the downstream system 436. This can be used to effect precision metering or dosing into the downstream system 436.

Figure 16:
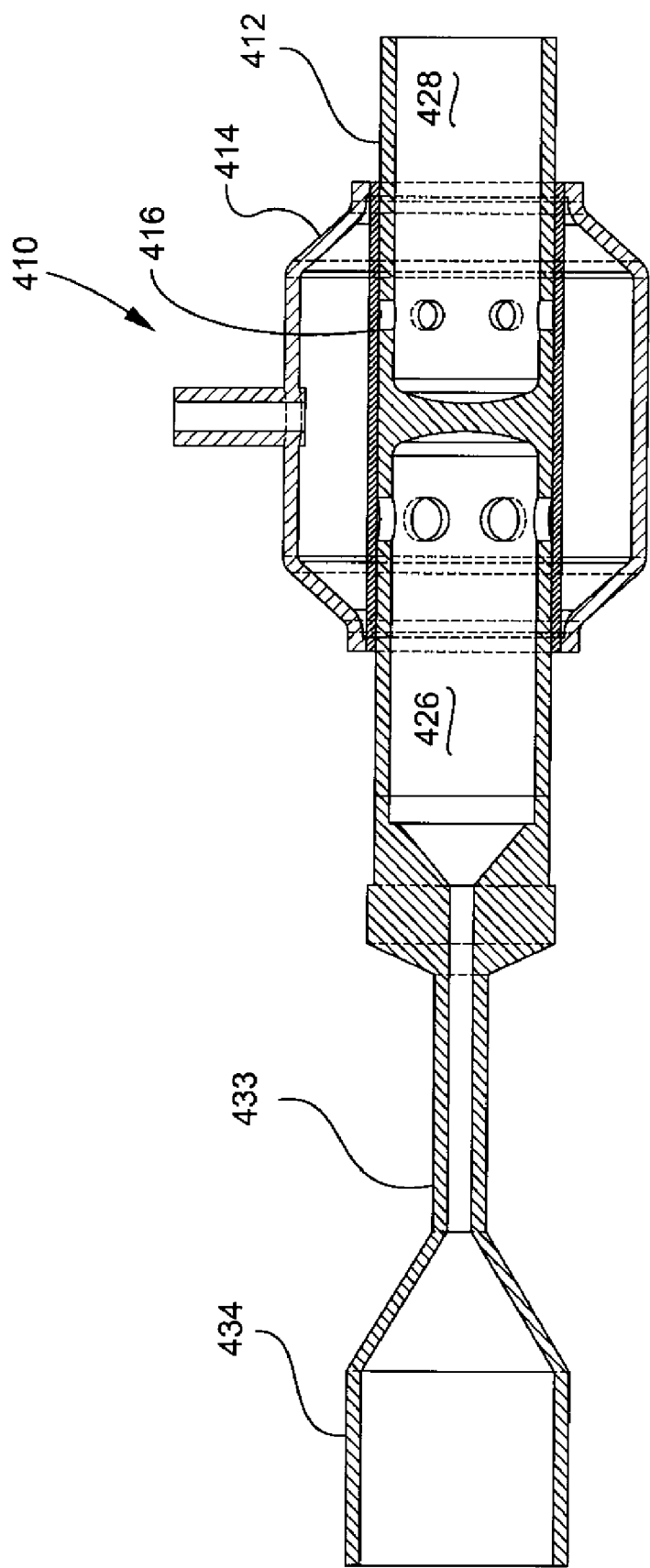
FIG. 16 is a cross-sectional view of a portion of another alternate pressure regulating valve body and membrane.
Figure 17:
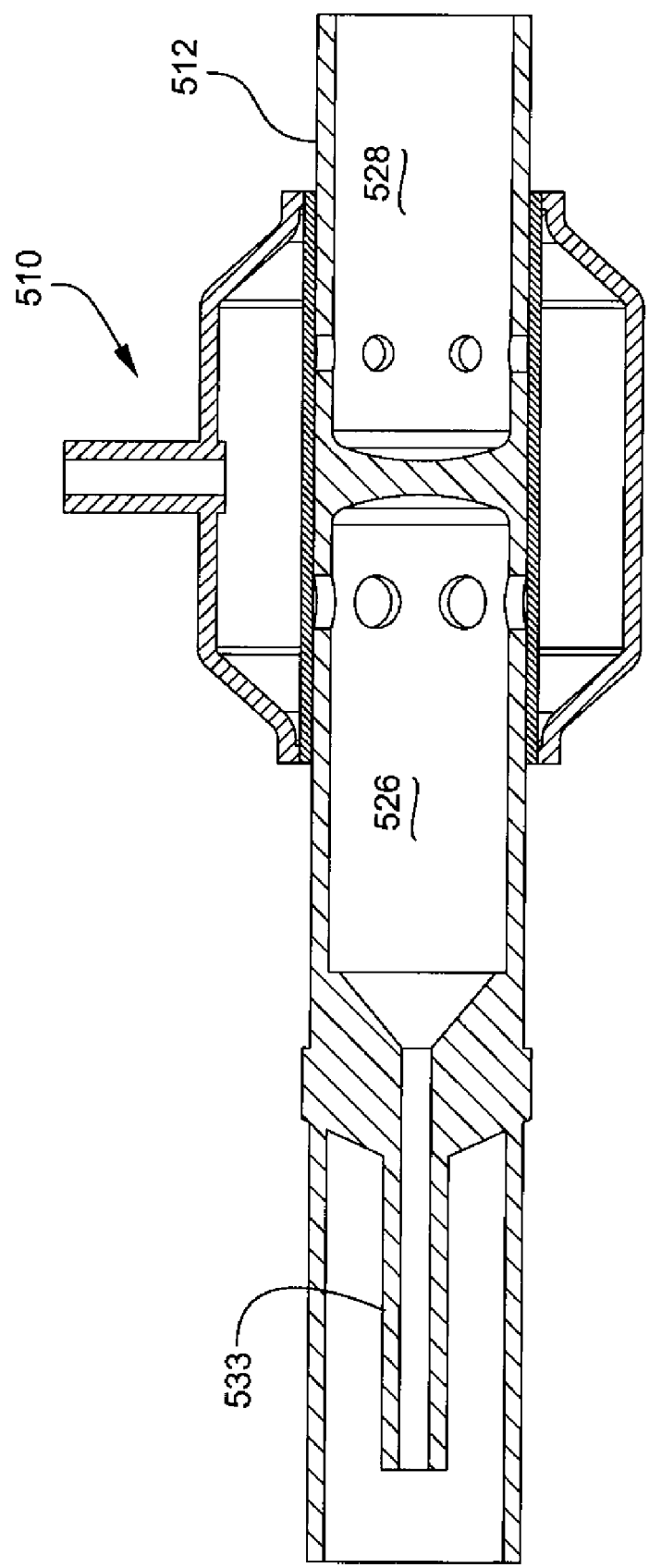
FIG. 17 is a cross-sectional view of a portion of another alternate pressure regulating valve body and membrane.

The restriction 432 may alternatively be incorporated as a part of the pressure regulating valve. For example, FIG. 16 illustrates an alternative pressure regulating valve 410. It is similar in construction to the pressure regulating valve 10 described above and includes a body 412 with an inlet chamber 426 and an outlet chamber 428, a reference housing 414, and a membrane 416. It differs from the pressure regulating valve 10 in that an orifice 433 is disposed between the inlet chamber 426 and a full-diameter connector end 434. FIG. 17 illustrates another alternative pressure regulating valve 510. including a body 512 with inlet and outlet chambers 526 and 528. An orifice 533 is disposed within an extended portion of the inlet chamber 526. This provides a durable configuration which protects the orifice 533 from bending. Either of the pressure regulating valves 410 or 510 may be used in the system depicted in FIG. 15.

Figure 8:
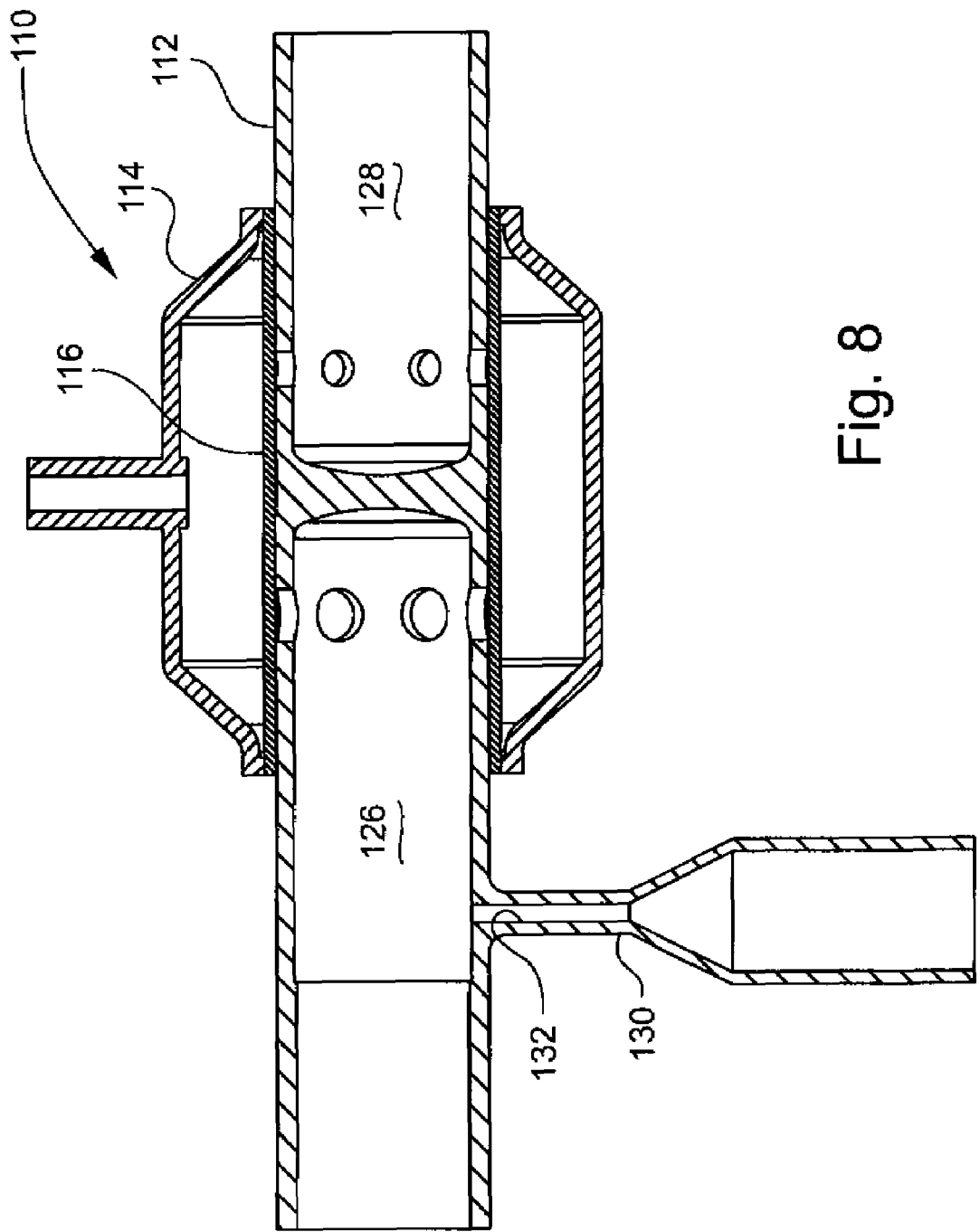
FIG. 8 is a cross-sectional view of a pressure regulating valve constructed according to another aspect of the invention.

FIG. 8 illustrates an alternative pressure regulating valve 110 that can be used for precision flow control. It is similar in construction to the pressure regulating valve 10 describe above and includes a body 112 with an inlet chamber 126, an outlet chamber 128, a reference housing 114, and a membrane 116. It differs from the pressure regulating valve 10 in that it includes a bypass outlet 130 connected to the inlet chamber 126.

Figure 9:
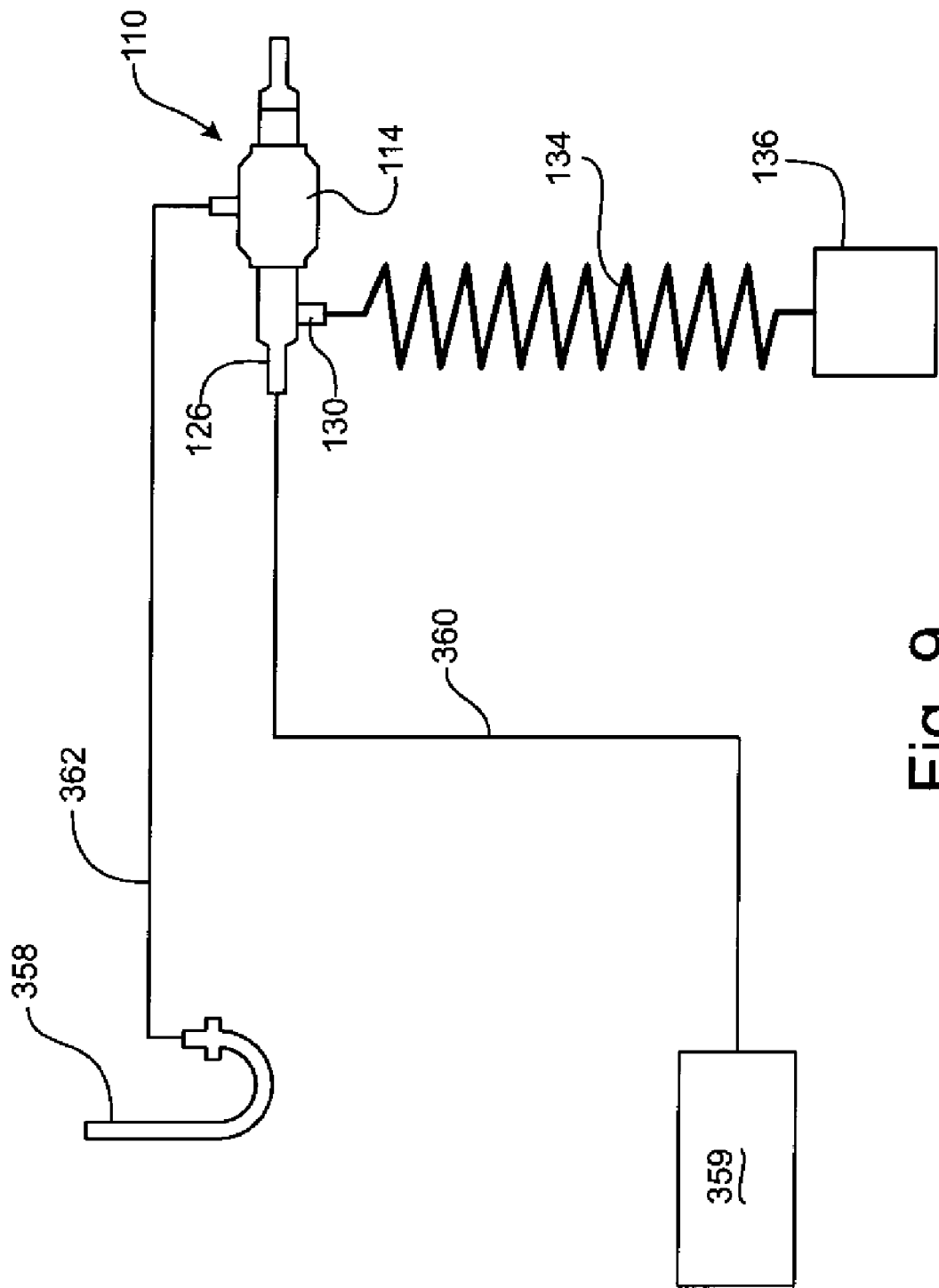
FIG. 9 is a schematic representation of a fluid system incorporating the pressure regulating valve of FIG. 8.

A schematic representation of a process system incorporating the pressure regulating valve 110 to achieve precision fluid flow is illustrated in FIG. 9. The process system includes a pressure reference source 358 connected to the reference housing 114 by a line 362. The inlet chamber 126 of the pressure regulating valve 110 is connected to a process pressure source 359 through a line 360

The pressure in the inlet chamber 126 is maintained by venting through the pressure regulating valve 110, or by replenishment from the process pressure source 359. The system allows for accurate, rapid pressure control in the inlet chamber 126, and thus at the bypass outlet 130, as described above. An outlet device of known fluid conductance is connected to the bypass outlet 130. As shown in FIG. 8, the outlet device is a precision orifice 132 which is incorporated as part of the bypass outlet 130. As shown in FIG. 9, the outlet device could instead be a capillary tube 134 having a high length-to-diameter ratio, in a coiled configuration. The fluid flow rate is given by the product of the fluid conductance of the outlet device and the pressure drop across the outlet device. The pressure regulating valve 110 provides fluid at a very consistent inlet pressure to the outlet device. This results in a stable, predictable flow rate through the outlet device to the downstream system 136. This can be used to effect precision metering into the downstream system, for example by providing a valve (not shown) to selectively permit or block fluid flow exiting the outlet device.

Figure 10:
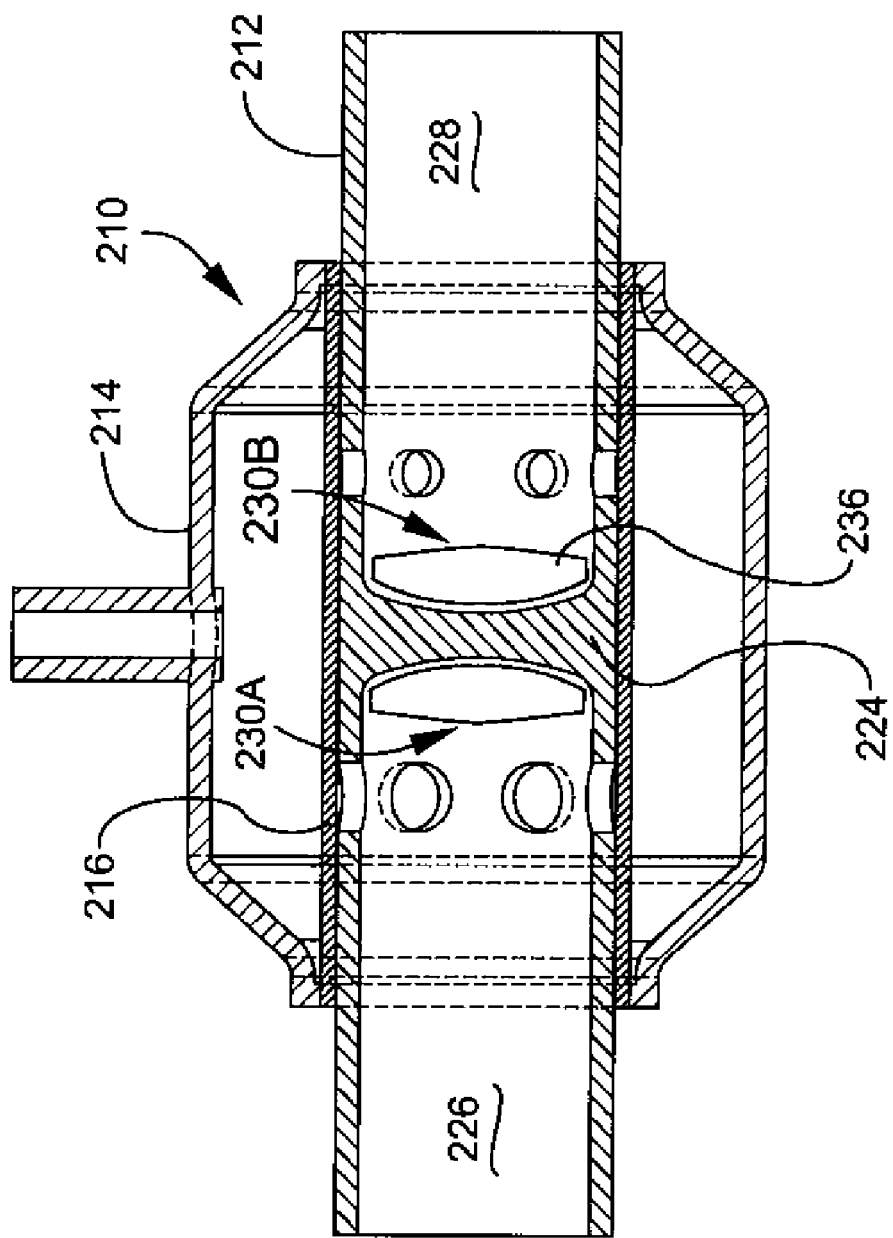
FIG. 10 is a cross-sectional view of a pressure regulating valve incorporating a chatter prevention feature.

The pressure regulating valves 10 or 110 may include means for inhibiting chatter. An example of such means is illustrated in FIG. 10, which shows a pressure regulating valve 210. The pressure regulating valve 210 is substantially similar in construction to the pressure regulating valve 10 and described above and includes a body 212 with an inlet chamber 226, an outlet chamber 228, and a bulkhead 224, a reference housing 214, and a membrane 216. Compressible objects such as open or closed cell foam are disposed in the inlet or outlet chambers 226 and 228. In this example, first and second sealed capsules 230A and 230B are disposed in the inlet and outlet chambers 226 and 228, respectively, against the bulkhead 224. Each capsule 230 has a flexible outer skin 236 and is filled with a gas, open or closed cell foam, or other material imparting resilient characteristics.

The bulk compressibility of the capsules 230A and 230B will vary depending on the application in which the pressure regulating valve 210 is used, with the bulk compressibility being greater for greater process pressures. For an application in which the exhaust (downstream) pressure is near atmospheric, the bulk compressibility should be lower than about 173 kPa (25 psi) in order to provide for maximum effectiveness. The compressibility is generally directly comparable to the magnitude of the working pressures. As an non-limiting example, open or closed cell elastomeric or polymeric foams with density less than about 0.3 g/cm$^3$ (18.7 lbs./ft.$^3$) have been found to be suitable for such applications.

Figure 11:
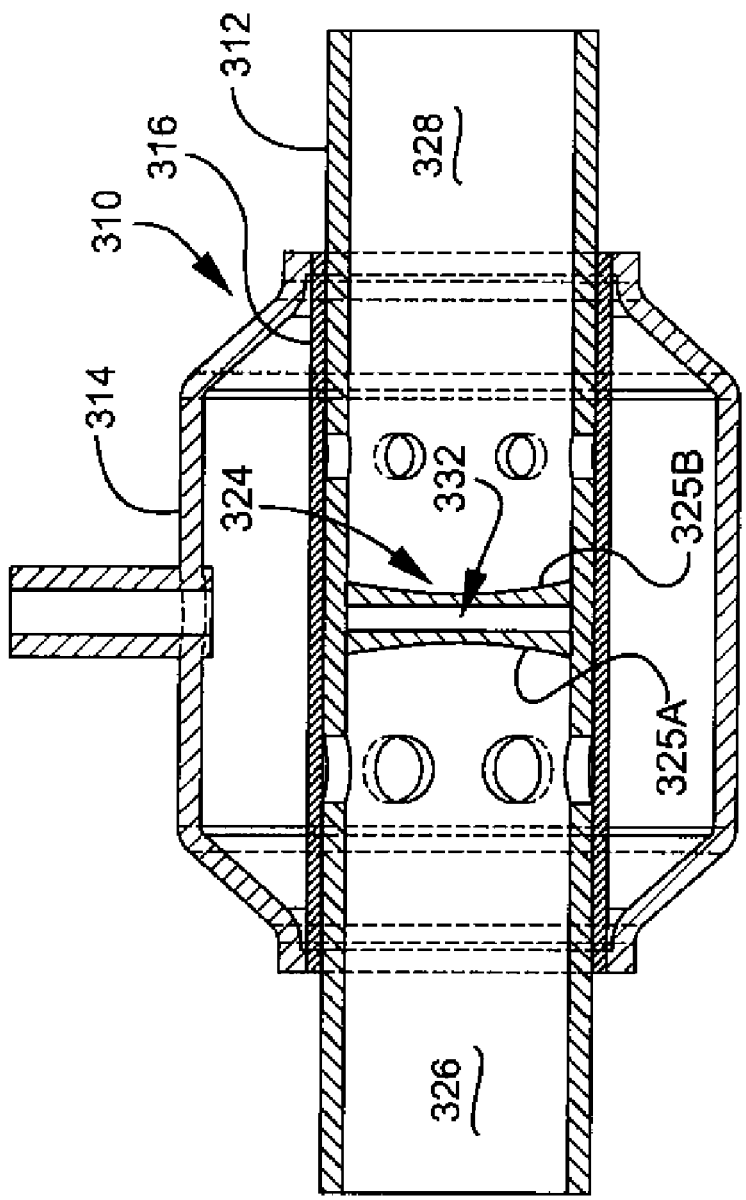
FIG. 11 is a cross-sectional view of a pressure regulating valve incorporating an alternative chatter prevention feature.

FIG. 11 illustrates another example of a pressure regulating valve 310 including chatter prevention means. The pressure regulating valve 310 includes a body 312 with an inlet chamber 326 and an outlet chamber 328, a reference housing 314, and a membrane 316. However, in this example, the bulkhead 324 comprises two relatively thin, spaced-apart walls 325A and 325B with a closed void 332 therebetween. The void 332 may be filled with a gas, open or closed cell foam, or other material imparting resilient characteristics. The flexible nature of the walls 325A and 325B allows the entire bulkhead structure 324 to act as a compressible member for chatter prevention.

The invention has been described with particular reference to the preferred embodiments which are intended to enable one of ordinary skill in the art to demonstrate the present invention. The preferred embodiments are not intended to limit the scope of the present invention which is set forth in the claims appended hereto.

What is claimed is:

1. A pressure regulating valve comprising:
    a body having an outer surface, the interior of the body separated into an inlet chamber adapted to be disposed in fluid communication with a fluid at a process pressure, and an outlet chamber, the body further including at least one inlet passage disposed in fluid communication with the inlet chamber and the outer surface, and at least one outlet passage communicating with the outer surface and the outlet chamber wherein the body is a generally cylindrical tube having a bulkhead disposed therein to separate the interior of the body into the inlet chamber and the outlet chamber;
    a reference housing adapted to be disposed in fluid communication with a fluid at a predetermined reference pressure; and
    an annular membrane disposed between the body and the reference housing, so as to circumscribe both the inlet and outlet passages;
    wherein the membrane is arranged such that, when the reference pressure is higher than the process pressure the membrane is engaged with the at least one outlet passage, and when the process pressure is higher than the reference pressure, the membrane is not engaged with the outlet passage; and
    at least one compressible member disposed in the inlet chamber or the outlet chamber.

2. The pressure regulating valve of claim 1 wherein at least one of the body, the membrane, and the reference housing is at least partially transparent.

3. The pressure regulating valve of claim 1 where the membrane is a thermoplastic film having a thickness of about 0.0005 inches to about 0.005 inches.

4. The pressure regulating valve of claim 1 wherein the body is a generally cylindrical tube having a bulkhead disposed therein to separate the interior of the body into the inlet chamber and the outlet chamber.

5. The pressure regulating valve of claim 1 wherein the body is irremovably retained within the reference housing.

6. The pressure regulating valve of claim 1 further comprising a bypass outlet connected in fluid communication with the inlet chamber.

7. The pressure regulating valve of claim 1 wherein the at least one compressible member is defined by the bulkhead having a pair of spaced-apart, flexible walls defining a void there between.

8. The pressure regulating valve of claim 1 wherein at least one fluid-wetted surface thereof is coated with a surface treatment effective to prevent the clotting of blood platelets thereon.

9. The pressure regulating valve of claim 1 further comprising means for biasing the membrane away from the body in a rest position.

* * * * *